(12) United States Patent
Iwanaga et al.

(10) Patent No.: US 11,959,560 B2
(45) Date of Patent: Apr. 16, 2024

(54) SOLENOID VALVE

(71) Applicant: Eagle Industry Co., Ltd., Tokyo (JP)

(72) Inventors: Hiroyuki Iwanaga, Tokyo (JP); Yoshinari Kasagi, Tokyo (JP); Kenta Furukawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 285 days.

(21) Appl. No.: 17/608,083

(22) PCT Filed: Apr. 28, 2020

(86) PCT No.: PCT/JP2020/018107
§ 371 (c)(1),
(2) Date: Nov. 1, 2021

(87) PCT Pub. No.: WO2020/226100
PCT Pub. Date: Nov. 12, 2020

(65) Prior Publication Data
US 2023/0250890 A1    Aug. 10, 2023

(30) Foreign Application Priority Data

May 8, 2019  (JP) .................................. 2019-088204

(51) Int. Cl.
*F16K 31/06*    (2006.01)
*F16K 3/314*    (2006.01)

(52) U.S. Cl.
CPC .......... *F16K 31/0613* (2013.01); *F16K 3/314* (2013.01); *F16K 31/0693* (2013.01); *F16K 31/0696* (2013.01)

(58) Field of Classification Search
CPC .. F16K 31/0613; F16K 3/314; F16K 31/0693; F16K 31/0696

(Continued)

(56) References Cited

U.S. PATENT DOCUMENTS

| | | | |
|---|---|---|---|
| 6,776,391 B1 * | 8/2004 | Goossens ................ | B60T 8/363 251/337 |
| 7,871,056 B2 * | 1/2011 | Kratzer ................ | B60T 8/3675 251/129.02 |

(Continued)

FOREIGN PATENT DOCUMENTS

| | | | |
|---|---|---|---|
| DE | 10104241 | 1/2001 | ............ F16K 15/04 |
| DE | 102006054941 | 5/2008 | ............... H01F 7/08 |

(Continued)

OTHER PUBLICATIONS

International Preliminary Report on Patentability issued in PCT/JP2020/018107, dated Nov. 18, 2021, with English translation, 6 pages.

(Continued)

*Primary Examiner* — John Bastianelli
(74) *Attorney, Agent, or Firm* — HAYES SOLOWAY P.C.

(57) ABSTRACT

The Disclosed is a solenoid valve, in which a rod is moved by a plunger that comes into contact with and separates from a stator by electromagnetic force, causing a valve body that opens and closes a valve to move reciprocally. The valve is configured such that a first space and a second space are formed at respective sides of the plunger in the movement direction thereof, a through-hole is formed in the plunger so as to be concentric with a center axis, the rod is arranged in the first space, and a communication passage is formed between an inner surface of the plunger and an outer surface of the rod and communicates with the first space S1 and the second space.

12 Claims, 5 Drawing Sheets

(58) Field of Classification Search
USPC .......................................... 251/129.15, 284
See application file for complete search history.

(56) References Cited

U.S. PATENT DOCUMENTS

| | | | |
|---|---|---|---|
| 8,134,436 B2* | 3/2012 | Yasoshima | H01F 7/127 335/220 |
| 8,328,157 B2 | 12/2012 | Schulz et al. | F16K 31/02 |
| 8,418,724 B2* | 4/2013 | Suzuki | F15B 13/0402 137/625.69 |
| 2009/0026399 A1 | 1/2009 | Ishibashi | F16K 31/02 |
| 2013/0061959 A1 | 3/2013 | Stephens | 137/544 |
| 2017/0108138 A1 | 4/2017 | Fujita et al. | F16K 31/06 |
| 2020/0063885 A1 | 2/2020 | Kasagi et al. | F16K 31/06 |
| 2020/0370673 A1 | 11/2020 | Fukudome et al. | F16L 31/06 |

FOREIGN PATENT DOCUMENTS

| | | | |
|---|---|---|---|
| DE | 102019131063 | 5/2020 | H01F 7/16 |
| DE | 102019111561 | 11/2020 | H01F 7/08 |
| EP | 2246601 | 11/2010 | F16K 31/06 |
| JP | 64-51765 | 3/1989 | F02M 51/00 |
| JP | 3-106702 | 11/1991 | H01F 7/16 |
| JP | 9-4735 | 1/1997 | F16K 11/044 |
| JP | 2003-254464 | 9/2003 | F16K 31/06 |
| JP | 2009-203991 | 9/2009 | F16K 31/06 |
| JP | 2014-214806 | 11/2014 | F16K 31/06 |
| JP | 2017-214906 | 12/2017 | F04B 27/18 |
| WO | WO2018105337 | 6/2018 | F16K 31/06 |
| WO | WO2019044759 | 3/2019 | F16K 31/06 |

OTHER PUBLICATIONS

International Search Report and Written Opinion issued in PCT/JP2020/018107, dated Jul. 7, 2020, with English translation, 13 pages.
International Preliminary Report on Patentability issued in PCT/JP2020/018108, dated Nov. 18, 2021, with English translation, 6 pages.
International Search Report and Written Opinion issued in PCT/JP2020/018108, dated Jul. 7, 2020, with English translation, 13 pages.
Chinese Official Action issued in related Chinese patent Application serial No. 202080032701.7, dated Feb. 25, 2023, 9 pages.
U.S. Appl. No. 17/607,834, filed Oct. 29, 2021, Shioi et al.
European Search Report issued in related European patent Application serial No. 20802131.1, dated Dec. 20, 2022, 9 pages.

* cited by examiner

SOLENOID VALVE

TECHNICAL FIELD

The present invention relates to, for example, a solenoid valve suitable for hydraulic control of a hydraulic circuit.

BACKGROUND ART

A conventional solenoid valve for hydraulic control includes a spool valve portion having a columnar spool housed in a sleeve, and a solenoid portion which has a stator, a plunger, and a solenoid case housing a molded solenoid unit configured such that a coil is covered with resin, and which drives the spool in an axial direction. The solenoid valve is arranged between a pressure source such as a pump or an accumulator and a supply destination, and can move the spool to supply fluid whose pressure and flow rate are adjusted to the supply destination.

The spool has a relatively large movement stroke in a sleeve. Thus, when the solenoid portion is driven to move the spool, fluid in an inner space of the solenoid portion may provide resistance to inhibit quick movement of the plunger.

For example, in a solenoid valve disclosed in Patent Citation 1, a bearing is disposed between an outer peripheral surface of a plunger and an inner peripheral surface of a coil, and spaces separated by the bearing are formed on respective sides of the plunger in the movement direction thereof. The plunger has a through-hole extending in an axial direction at the center. In a state where a tubular rod is inserted into and fixed to the through-hole of the plunger, a spool is arranged so that it can come into contact with one end of the rod, and the through-hole of the plunger and the through-hole of the rod are in communication with each other. An end portion of the spool is provided with a through hole which is open in a radial direction and is in communication with one space, and is open in the axial direction so that it can communicate with the through-hole of the rod. When the plunger moves to one side, the fluid in the one space moves to the other space through the through hole, the through-hole of the rod, and the through-hole of the plunger. When the plunger moves to the other side, the fluid in the other space moves to the one space through the through-hole of the plunger, the through-hole of the rod, and the through hole. In this way, when the plunger moves, the fluid in a space formed on one side in the movement direction is moved to a space on the other side in the movement direction, so that the resistance provided by the fluid acting on the plunger is reduced.

Further, in a solenoid valve disclosed in Patent Citation 2, a rod is connected at the center of a plunger, and an outer peripheral surface of the plunger has a slit extending in the movement direction of the plunger. The fluid present in spaces on respective sides of the plunger in the movement direction thereof is moved by the slit.

CITATION LIST

Patent Literature

Patent Citation 1: Microfilm of Japanese Utility Model Application No. 02-14728 (Japanese Utility Model Publication No. 03-106702) (pages 4 and 5, FIG. 4)
Patent Citation 2: JP 2014-214806 A (page 4, FIG. 1)

SUMMARY OF INVENTION

Technical Problem

However, in the solenoid valve of Patent Citation 1, the plunger is easily moved by the bearing disposed between the outer peripheral surface of the plunger and the inner peripheral surface of the solenoid portion, but the fluid does not substantially pass between the outer peripheral surface of the plunger the inner peripheral surface of the coil, so that the rod is required to have a large through-hole. This reduces the strength of the rod and may deform the rod to generate the disturbance of the fluid flow in the through-hole of the rod. Further, in the solenoid valve of Patent Citation 2, the slit is formed at a position eccentric from the center axis of the plunger, so that a fluid resistance acts in the radial direction of the plunger and an imbalance in the magnetic flux passing through the plunger may be generated to cause the unstable operation of the plunger.

The present invention has been made in view of such a problem, and an object of the present invention is to provide a solenoid valve in which a plunger can be operated smoothly and stably.

Solution to Problem

In order to solve the problem described above, a solenoid valve according to the present invention is a solenoid valve, in which a rod is moved by a plunger that comes into contact with and separates from a stator by electromagnetic force, causing a valve body that opens and closes a valve to move reciprocally, wherein a first space and a second space are formed at respective sides of the plunger in a movement direction of the plunger, a through-hole is formed in the plunger so as to be concentric with a center axis, the rod is arranged in the first space, and a communication passage is formed between an inner surface of the plunger and an outer surface of the rod and communicates with the first space and the second space. According to the aforesaid feature of the present invention, the fluid moves between the first space and the second space through the through-hole of the high-strength plunger, so that the disturbance of the fluid moving between the first space and the second space can be prevented. In addition, since the through-hole is formed so as to be concentric with the center axis of the plunger, the fluid resistance is prevented from acting unevenly in the radial direction of the plunger, and the magnetic flux acts equally on the plunger, so that the plunger can be stably moved in the axial direction.

It may be preferable that a part of the rod having a cut-out formed outside may be fitted into and fixed to the through-hole. According to this preferable configuration, the cutout is formed at the part of the rod which is fitted into the through-hole of the plunger, so that a large volume of the plunger can be secured to widely form an effective region of the magnetic flux in the plunger in a well-balanced manner.

It may be preferable that the cut-out is formed to extend to the first space. According to this preferable configuration, the fluid is guided to the cut-out and flows between the communication passage and the first space, so that the fluid can reliably flow in and out therebetween.

It may be preferable that at least another cut-out is formed in the part of the rod, and the cut-outs are equiangularly arranged in a circumferential direction. According to this preferable configuration, the fluid resistance acts on the plunger in a well-balanced manner, and the effective region of the magnetic flux in the plunger can be formed in a well-balanced manner, so that the movement of the plunger can be stabilized.

It may be preferable that a fitting side end portion of the rod forms a tapered shape. According to this preferable configuration, the rod can be easily fitted into the through-hole, and the fluid can be smoothly moved to the communication passage.

It may be preferable that the rod has a fitting restricting portion that comes into contact with an end face of the plunger.

According to this preferable configuration, when the fitting restricting portion comes into contact with the end face of the plunger, the fitting depth of the rod with respect to the plunger can be determined.

DESCRIPTION OF EMBODIMENTS

A mode for carrying out a solenoid valve according to the present invention will be described below based on an embodiment.

Embodiment

The solenoid valve according to the embodiment of the present invention will be described with reference to FIGS. 1 to 5. Hereinafter, the right side of the drawing sheet of FIG. 2 will be described as one end side of the solenoid valve in an axial direction, and the left side of the drawing sheet of FIG. 2 will be described as the other end side of the solenoid valve in the axial direction.

Figure 1:
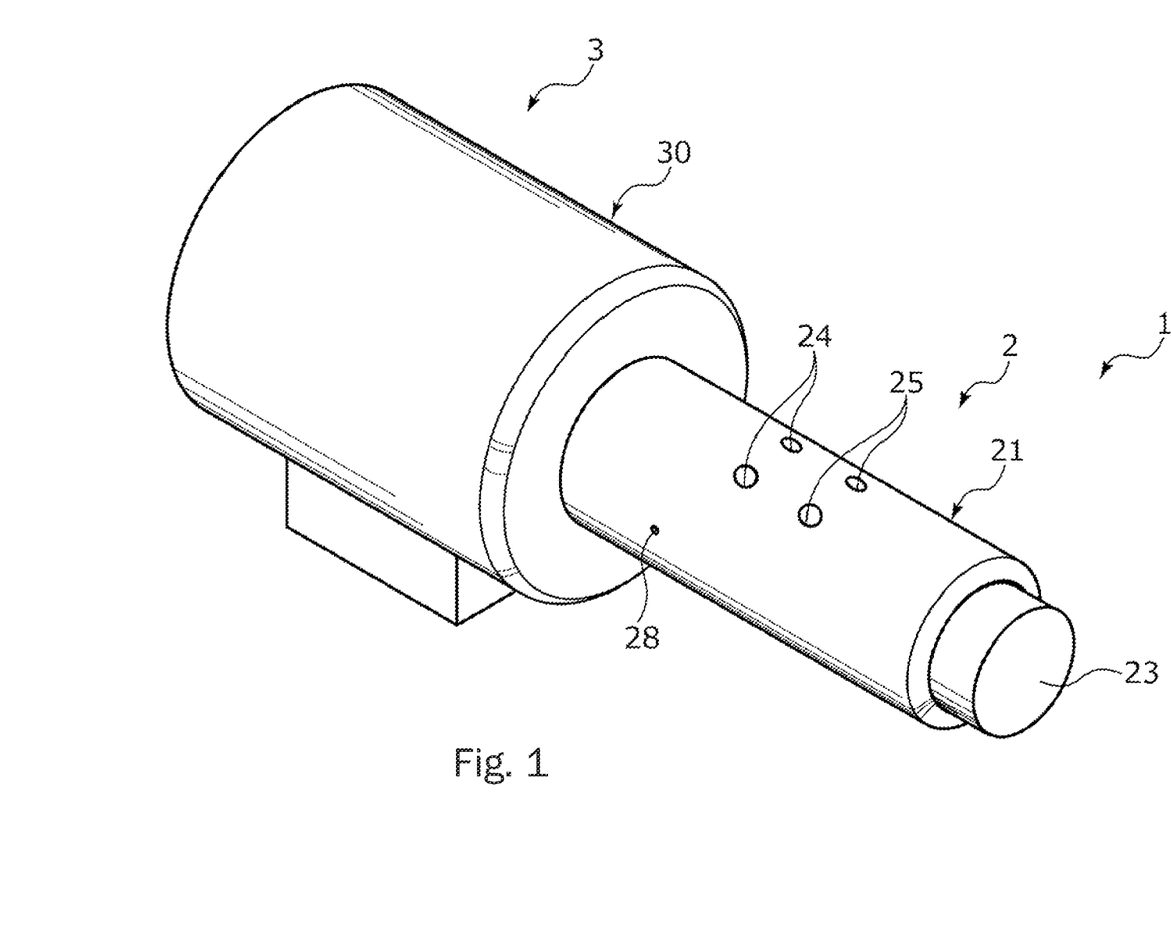
FIG. 1 is a perspective view of a solenoid valve according to an embodiment of the present invention.

As shown in FIG. 1, a solenoid valve 1 according to the embodiment of the present invention is a spool-type solenoid valve, and is used for a hydraulically controlled device, for example, an automatic transmission of a vehicle, or the like. The solenoid valve 1 is horizontally attached to a mounting hole of a valve housing on the device side and is used as a so-called oil-immersed solenoid valve immersed in hydraulic oil that is a liquid in the valve housing.

Figure 2:
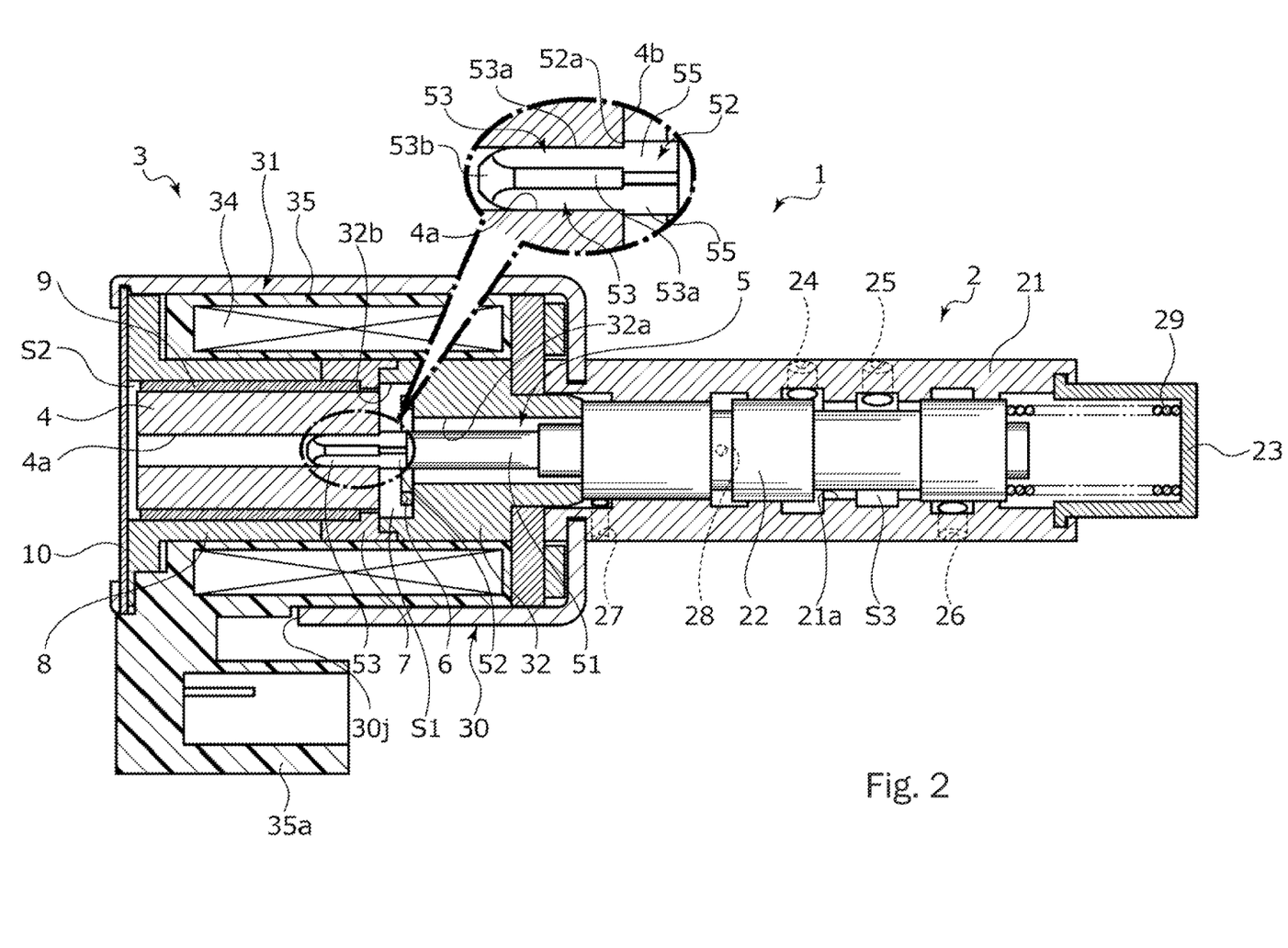
FIG. 2 is a side sectional view of the solenoid valve in the embodiment. For convenience of explanation, a spool and a rod are shown in a side view.

As shown in FIGS. 1 and 2, the solenoid valve 1 is configured such that a valve portion 2 for adjusting the flow rate of fluid, that is, control fluid such as hydraulic oil, is integrally attached to a solenoid portion 3. FIG. 2 shows an OFF state of the solenoid valve 1 in which a coil 34 of a molded solenoid unit 31 is not energized.

First, the structure of the valve portion 2 will be described. As shown in FIGS. 1 and 2, the valve portion 2 includes a sleeve 21 provided with openings of various ports such as an input port 24, an output port 25, a discharge port 26, a drain port 27, and a feedback port 28, which are connected to a flow path provided in the mounting hole of the valve housing, a spool 22 as a valve body housed in a liquid-tight manner in a through-hole 21a formed to extend in the axial direction on the radially inner side of the sleeve 21, a coil-shaped spring 29 for biasing the spool 22 to the other end side in the axial direction, and a retainer 23 for holding the spring 29.

The sleeve 21 is provided with the discharge port 26, the output port 25, the input port 24, the feedback port 28, and the drain port 27 in order from one end side in the axial direction to the other end side in the axial direction. The spool 22 is capable of reciprocating in the axial direction, and reciprocating the spool 22 in the axial direction changes the communication state of various ports to control the pressure and flow rate of the hydraulic oil. The sleeve 21, the spool 22, and the retainer 23 are made of a material such as aluminum, iron, stainless steel, or resin.

Next, the structure of the solenoid portion 3 will be described. As shown in FIG. 2, the solenoid portion 3 mainly includes a solenoid case 30 made of a magnetic metal material such as iron, the molded solenoid unit 31 housed in the solenoid case 30, a stator 32 arranged inside the molded solenoid unit 31, and a plunger 4 arranged on the other side of the stator 32 in the axial direction so as to be axially movable.

The molded solenoid unit 31 is formed by molding the coil 34 with a resin 35, and is configured such that the control current is supplied to the coil 34 from a connector of a connector portion 35a extending outward from an opening portion 30j provided on the radially outer side of the solenoid case 30. The molded solenoid unit 31 is integrally formed with the radially outer side of the stator 32. Further, the solenoid case 30 has an opening at the other end in the axial direction, and the opening is closed, to which a lid member 10 is swaged.

The stator 32 is a tubular body having a through-hole 32a extending in the axial direction at the central portion thereof, and is made of a magnetic metal material such as iron. The stator 32 has a recess 32b at the other end in the axial direction which is recessed on one end side in the axial direction, and the recess 32b is in communication with the through-hole 32a. Further, the recess 32b has a bottom portion to which a ring-shaped damper member 6 made of a non-magnetic material such as resin or rubber is fixed. Further, the stator 32 has an end face on one end side in the axial direction, with which the other end portion of the spool 22 in the axial direction is in contact, so that the spool 22 is restricted from moving to the other side in the axial direction.

Further, a first tubular body 7 made of a non-magnetic material is disposed on the other end side of the stator 32 in the axial direction, and a second tubular body 8 made of a magnetic material is disposed on the other end side of the first tubular body 7 in the axial direction, and a third tubular body 9 made of a magnetic material is disposed inside the first tubular body 7 and the second tubular body 8 so as to be arranged over the first tubular body 7 and the second tubular body 8. The third tubular body 9 has an inner peripheral surface subjected to low friction processing, and has the high sliding ability with respect to the plunger 4.

The plunger 4 is formed in a cylindrical shape made of a magnetic metal material such as iron, and is arranged so as to be slidable on the inner peripheral surface of the third tubular body 9. An outer peripheral surface of the plunger 4 and the inner peripheral surface of the third tubular body 9 are slightly separated from each other, so that almost no fluid can pass through a gap therebetween.

A space S1 is formed as one space on one side of the plunger 4 in the axial direction, and a space S2 is as the other space formed on the other side of plunger 4 in the axial direction. The plunger 4 has a through-hole 4a extending so as to be concentric with the center axis. The space S1 is defined by the plunger 4, the through-hole 32a of the stator 32, the recess 32b, and the spool 22, and the space S2 is defined by the plunger 4, the second tubular body 8, and the lid member 10. The space S3 in the sleeve 21 is separated from the space S1 by the spool 22, and functions as a third space different from the spaces S1 and S2.

An end of the rod 5 on the other side, which is a third part 53 to be described later, a part of the rod 5 which is inserted through the through-hole 32a of the stator 32, is fitted into and fixed to the one end side of the through-hole 4a of the plunger 4 in the axial direction, and an end of the rod 5 on one end side in the axial direction is in contact with the end face of the spool 22 on the other end side in the axial direction. That is, the rod 5 is arranged in space S1. The end of the rod 5 on the one end side in the axial direction may not be in contact with the end face of spool 22 on the other end side in the axial direction, or may be fixed thereto.

Figure 3:
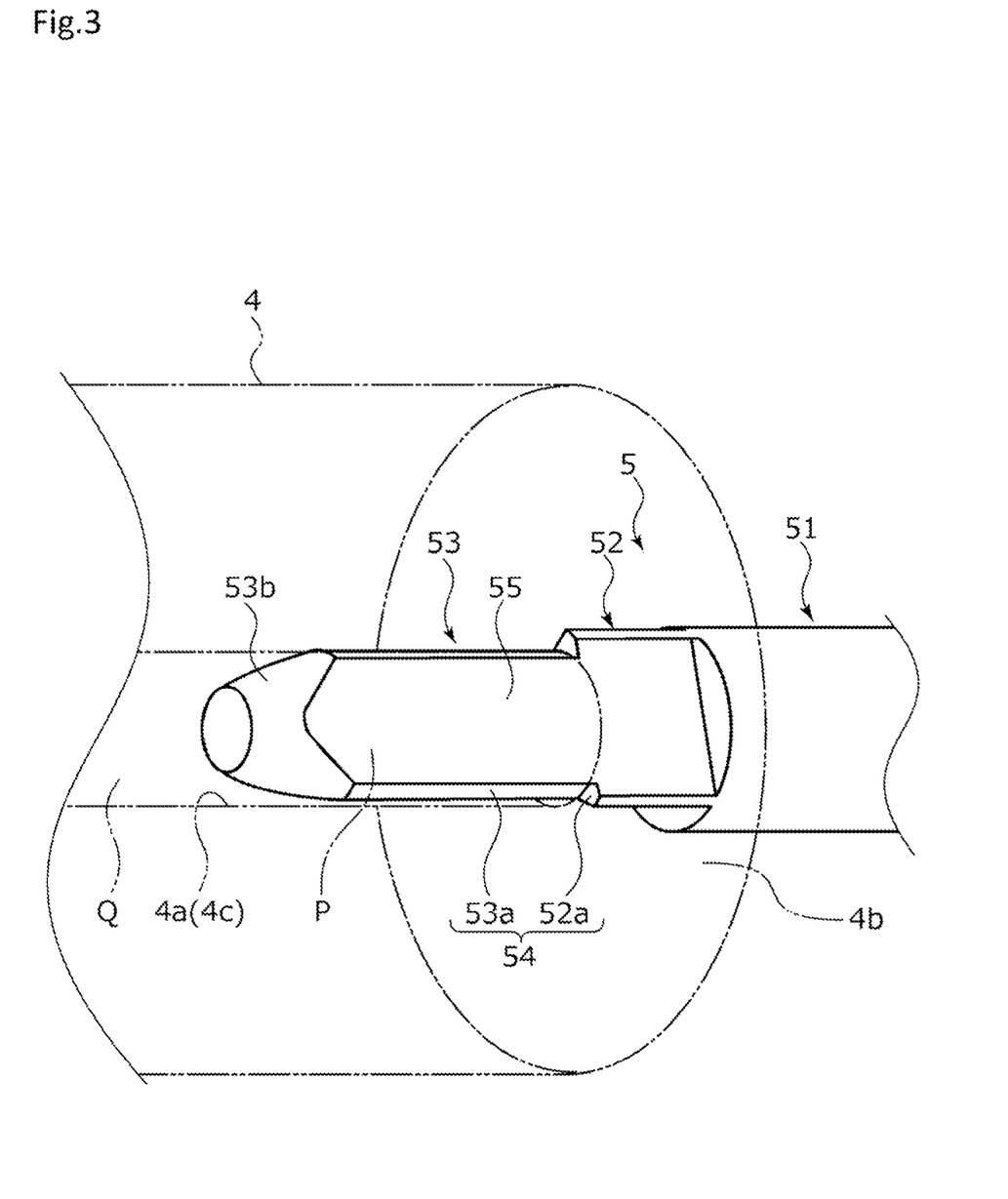
FIG. 3 is a perspective view showing the shape of the other end side of the rod in an axial direction in the embodiment.

Then, the structure of the rod 5 will be described. As shown in FIGS. 2 and 3, the rod 5 is made of a non-magnetic material such as metal or resin, and has a first part 51, a second part 52, and the third part 53 in order from one end side in the axial direction to the other end side in the axial direction. The rod 5 may be made of a magnetic metal material such as iron.

The first part 51 forms a circular shape in cross section, the second part 52 forms a substantially regular triangle shape in cross section, and the third part 53 forms a substantially regular triangle shape in cross section smaller than the second part 52. The second part 52 and the third part 53 are formed by notching a columnar rod member.

The outer peripheral surfaces of the corner portions of the second part 52 viewed from the axial direction extend flat in the axial direction along the outer peripheral surface of the first part 51. Further, the corner portions of the third part 53 viewed from the axial direction are arranged radially inward of the corner portions of the second part 52, and outer peripheral surfaces 53a of the corner portions of the third part 53 and end faces 52a of the second part 52 on the other end side in the axial direction form step portions 54. Further, cutout surfaces 55 between the corner portions of the second part 52 and between the corner portions of the third part 53 form the same surface extending parallel to the axial direction. Further, a fitting side end portion 53b of the third part 53 formed at the other end portion in the axial direction has a shape that tapers toward the other end side in the axial direction, and the tip thereof is formed to extend perpendicular to the axial direction.

The configuration is illustrated in which the cutout surfaces 55 form the same flat surface over the second part 52 and the third part 53, but the cutout surfaces 55 may not be the same flat surface, and for example, may have a slight step, inclination, or the like between the second part 52 and the third part 53. Further, the fitting side end portion 53b of the third part 53 may not taper but extend to the end on the other end side in the axial direction.

Figure 4:
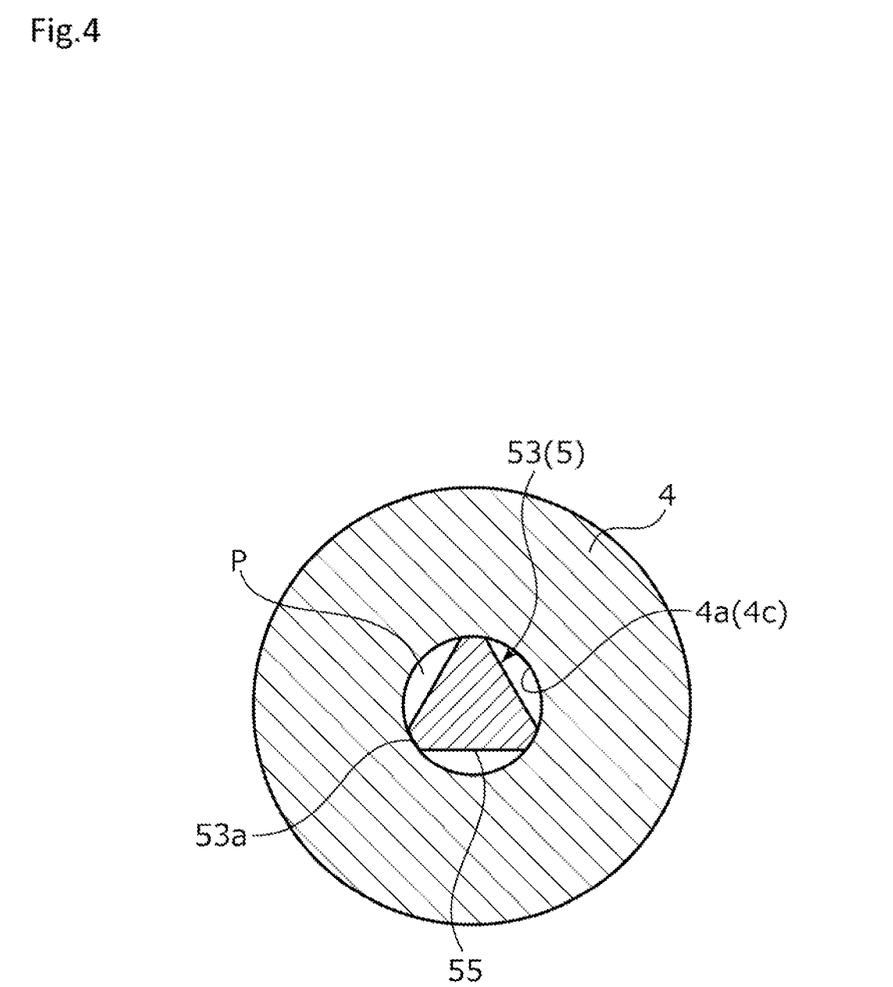
FIG. 4 is a cross-sectional view showing a fitting state between a third part of the rod and a through-hole of a plunger in the embodiment.

As shown in FIGS. 3 and 4, the third part 53 of the rod 5 is fitted into and fixed to the one end side of the through-hole 4a of the plunger 4 in the axial direction. That is, the outer peripheral surfaces 53a of the corner portions of the third part 53 and the inner peripheral surface of the through-hole 4a of the plunger 4 are in pressure contact with each other. When the third part 53 is fitted into the through-hole 4a, the fitting side end portion 53b is guided to an edge portion of the through-hole 4a of the plunger 4 to facilitate the fitting of the third part 53 into the through-hole 4a since the fitting side end portion 53b of the third part 53 has a tapered shape.

Further, when the third part 53 is fitted into the through-hole 4a by a predetermined length, the end faces 52a of the second part 52 protruding radially outward of the third part 53 come into contact with an end face 4b of the plunger 4 on one end side in the axial direction (see particularly FIG. 2). In this way, when the end faces 52a of the second part 52 come into contact with the end face 4b of the plunger 4 on one end side in the axial direction, the fitting of the rod 5 can be restricted to determine the fitting depth of the rod 5 with respect to the plunger 4, so that the rod 5 can be accurately fixed to the plunger 4. That is, the end faces 52a of the second part 52 function as a fitting restricting portion of the rod 5.

In a state where the third part 53 of the rod 5 is inserted into the through-hole 4a of the plunger 4, spaces are formed to be enclosed by the inner surface 4c of the plunger 4 defining the through-hole 4a of the plunger 4 and the cutout surfaces 55 that is outer surfaces of the third part 53 of the rod 5, and the spaces correspond to communication passages P (see FIG. 4). Further, a part of the through-hole 4a of the plunger 4, into which the third part 53 of the rod 5 is not inserted, corresponds to a communication passage Q. The communication passage Q is in communication with the communication passages P, and is open into and in communication with the space S2. In the embodiment, three communication passages P are equiangularly arranged in a circumferential direction of the third part 53. Further, the second part 52 is arranged on one side in the axial direction of the end face 4b of the plunger 4, that is, in the space S1, and the cutout surfaces 55 formed over the third part 53 and the second part 52 extend to the space S1.

Figure 5A:
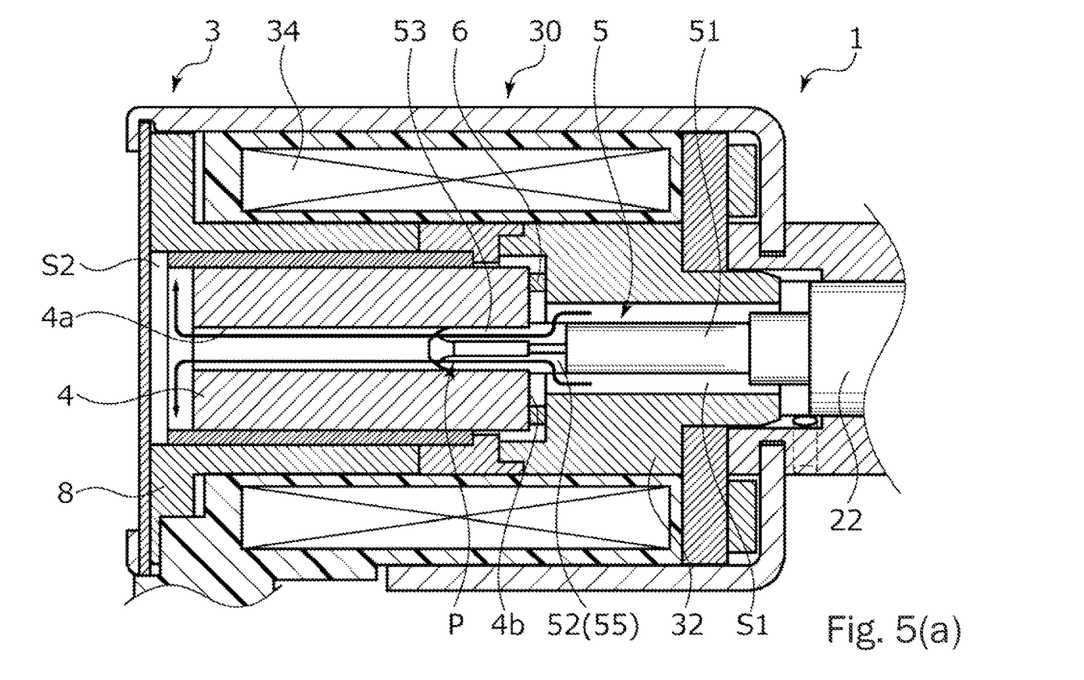
FIG. 5A is a side sectional view showing a state in which the solenoid valve is turned from an OFF state to an ON state.

Next, the operation of the solenoid valve 1 will be described. In the OFF state of the solenoid valve 1 shown in FIG. 2, the coil 34 is energized so that a magnetic circuit is formed by the solenoid case 30, the second tubular body 8, the third tubular body 9, the plunger 4, and the stator 32 to generate a magnetic force between the stator 32 and the plunger 4. This enables the plunger 4 and the rod 5 to move toward the stator 32 to one side in the axial direction, as shown in FIG. 5 (a). Thus, the end of rod 5 on one end side in the axial direction pushes the end face of the spool 22 on the other end side in the axial direction to move the spool 22 to one side in the axial direction against the urging force of the spring 29, so that the amount of control fluid flowing from the input port 24 to the output port 25 of the sleeve 21 can be varied.

At this time, as the plunger 4 moves to one side in the axial direction, the fluid in the space S1 is guided to the cutout surfaces 55 of the second part 52 and moves to the space S2 through the communication passages P and the communication passage Q. Further, when the plunger 4 moves to one side in the axial direction, the end face 4b of the plunger 4 comes into contact with the damper member 6 made of a non-magnetic material. This prevents the plunger 4 from sticking to the stator 32.

Figure 5B:
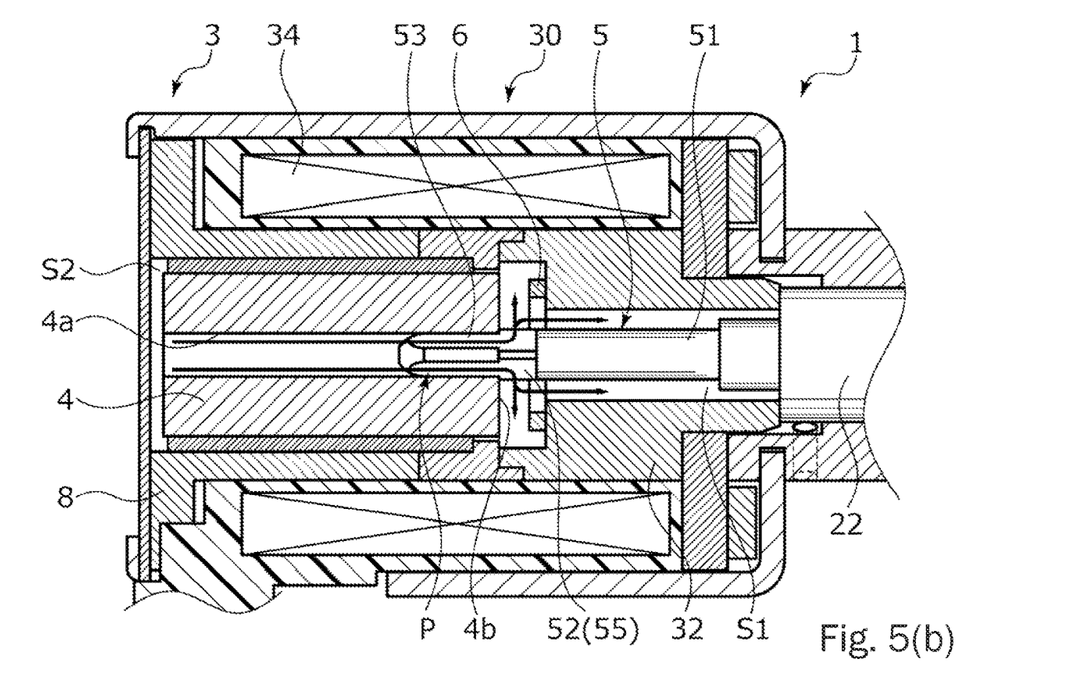
FIG. 5B is a side sectional view showing a state in which the solenoid valve is turned from the ON state to the OFF state in the embodiment.

Further, when the energization to the coil 34 is cut off, so that the magnetic force generated between the stator 32 and the plunger 4 is relatively weakened, the spool 22 moves to the other side in the axial direction due to the urging force of the spring 29, and accordingly, the plunger 4 and the rod 5 move to the other side in the axial direction, as shown in FIG. 5 (*b*). Further, the end face of the spool 22 on the other end side in the axial direction comes into contact with the end face of the stator 32 on one end side in the axial direction to restrict the movement of the spool 22.

At this time, as the plunger 4 moves to the other side in the axial direction, the fluid in the space S2 is guided to the through-hole 4*a* of the plunger 4, the communication passages P, and the cutout surfaces 55 of the second part 52, and moves to the space S1. In a state where the plunger 4 and the rod 5 move toward the stator 32 to one side in the axial direction (the state in FIG. 5A), the damper member 6 prevents the plunger 4 from sticking to the stator 32, so that when the energization to the coil 34 is cut off, the plunger 4 and the rod 5 can immediately move to the other side in the axial direction due to the urging force of the spring 29.

In this way, the fluid is moved between the space S1 and the space S2 through the communication passages P and Q formed by utilizing the through-hole 4*a* formed so as to be concentric with the center axis of plunger 4, so that the fluid resistance acting on plunger 4 can be reduced to smoothly move the plunger 4. The third part 53 of the rod 5 is fitted into and fixed to the one end side of the through-hole 4*a* of the plunger 4 in the axial direction, so that a part of the through-hole 4*a* is closed by the rod 5, while the communication passages P are formed between the inner peripheral surface of the plunger 4 and the cutout surfaces 55 of the third part of the rod 5. Thus, a passage in communication between the space S1 and the space S2 is not required to be additionally formed at a position eccentric from the center axis of the plunger 4.

As a result, on movement of the plunger 4, the fluid resistance of the fluid flowing into and out between the space S1 and the space S2 is prevented from unequally acting on the plunger 4, for example, acting unevenly in the radial direction of the plunger 4, and the magnetic flux generated at the solenoid portion 3 substantially equally acts on the plunger 4. Thus, the plunger 4 can be moved smoothly and stably in the axial direction. In other words, a decrease in thrust of plunger 4 can be prevented.

Further, the volume of the plunger 4 itself can be formed to be large, so that the strength of the plunger 4 can be ensured, and the disturbance of flow in the through-hole 4*a* due to deformation of the plunger 4 can be prevented, and the magnetic flux can effectively act on the plunger 4. Thus, the solenoid valve 1 can be made smaller.

Further, the third part of the rod 5 having the cutout surfaces 55 formed outside is fitted into and fixed to the one end side in the axial direction of the through-hole 4*a*, and the inner surface 4*c* of the plunger 4 and the cutout surfaces 55 that are cut-outs formed in the rod 5 form the communication passages P therebetween. The communication passages P are in communication with the space S1 and the communication passage Q, so that the fluid can be moved between the space S1 and the space S2 through the communication passages P and the communication passage Q. Accordingly, a passage in communication between the through-hole 4*a* and the space S1 is not required to be additionally formed in plunger 4, so that a large volume of plunger 4 can be secured to form an effective region of the magnetic flux in plunger 4 in a well-balanced manner. Furthermore, by utilizing the through-hole 4*a*, the rod 5 is fitted into and fixed to the plunger 4, so that a mounting hole for fixing the rod 5 to the plunger 4 is not required to be additionally formed, and the processing cost of the plunger 4 can be reduced.

Further, the second part 52 is arranged in the space S1, and a part of the cutout surfaces 55 formed over the third part 53 and the second part 52 is arranged in the space S1. That is, the cutout surfaces 55 are formed so as to extend from the communication passages P to the side of the space S1, so that the fluid can be reliably flown into and out between the space S1 and the communication passages P. Further, since the cutout surfaces 55 are formed flat, the fluid can be smoothly moved.

Further, since three communication passages P are equiangularly arranged around the rod 5, the fluid resistance acts on the plunger 4 in a well-balanced manner, and the effective region of the magnetic flux in the plunger 4 can be formed in a well-balanced manner, so that the movement of the plunger 4 can be stabilized. In the embodiment, the configuration is illustrated in which three communication passages P, that is, three cut-outs of the rod 5 are formed in the circumferential direction of the rod 5, but one, two or four or more cut-outs may be formed, preferably, as long as they are equiangularly arranged in the circumferential direction.

Further, in the embodiment, the configuration is illustrated in which the rod 5 is made of a non-magnetic material, but it may be made of a magnetic material. In this case, the communication passages P are equiangularly arranged around the rod 5, so that the effective region of the magnetic flux in the rod 5 can be formed in a well-balanced manner, and thus the movement of the plunger 4 and the rod 5 can be stabilized.

Further, since the fitting side end portion 53*b* of the third part 53 is tapered, the fluid can be smoothly moved along the shape of the fitting side end portion 53*b*.

Further, since the space S3 in the sleeve 21 is separated from the spaces S1 and S2 by the spool 22, a contamination contained in the fluid in the space S3 is difficult to enter the spaces S1 and S2, so that a malfunction in the plunger 4 due to the contamination can be prevented.

In the embodiment, the cut-outs (the cutout surfaces 55) forming the communication passages P together with the inner surface 4*c* of the plunger 4, that is, the surface that defines the through-hole 4*a* are formed by notching the rod 5, but the present invention is not limited to this. A plurality of protrusions protruding radially outward may be formed so as to be pressed against the plunger inner surface from the outer peripheral surface of the rod, so that grooves extending in the radial direction between the protrusions may be formed.

Although the embodiments according to the present invention have been described above with reference to the drawings, the specific configuration is not limited to these embodiments, and any changes or additions within the scope of the scope of the present invention are included in the present invention.

For example, in the embodiments described above, the configuration is illustrated in which the rod 5 is fitted into and fixed to the through-hole 4*a* of the plunger 4, but the rod 5 may be fixed to the through-hole 4*a* of the plunger 4 by a fixing member such as a bolt, welding or adhesion.

Further, in the embodiments described above, the configuration is illustrated in which the rod 5 is formed separately from the plunger 4, but the plunger 4 and the rod 5 may be integrally formed with each other.

Further, in the embodiments described above, the configuration is illustrated in which the cutout surfaces 55 of the rod 5 are located in the communication passages P and the space S1, but, for example, a groove or a slit may be provided in the plunger to form the communication passage P, enabling the rod to be fitted into and fixed to the through-hole, and enabling the fluid to be moved between the spaces S1 and S2.

Further, in the embodiments described above, the configuration is illustrated in which the plunger 4 moves to the other side in the axial direction in the OFF state of the solenoid valve 1 and the plunger 4 moves to one side in the axial direction in the ON state of the solenoid valve 1, but the plunger 4 may move to one side in the axial direction in the OFF state of the solenoid valve 1 and plunger 4 may move to the other side in the axial direction in the ON state of the solenoid valve 1.

Further, in the embodiments described above, the configuration is illustrated in which the plunger 4 is in a non-contact state with the stator 32 due to the damper member 6 in the ON state of the solenoid valve 1, but the plunger 4 may be in contact with the stator 32.

Further, in the embodiments described above, the end face of the rod 5 on one end side in the axial direction which comes in contact with the spool 22 is a flat surface, but it may be formed to be a curved surface, for example.

Further, in the embodiments described above, the spool-type solenoid valve having a spool as a valve body has been described, but the present invention is not limited to this, and a solenoid valve having a globe valve, a gate valve or the like may be used.

REFERENCE SIGNS LIST 1 solenoid valve
2 valve portion
3 solenoid portion
4 plunger
4a through-hole
4b end face
4c inner surface
5 rod
21 sleeve
22 spool
29 spring
30 solenoid case
32 stator
34 coil
51 first part
52 second part
53 third part
53b fitting side end portion
55 cutout surface
P communication passage
Q communication passage
S1 space (first space)
S2 space (second space)
S3 space (third space)

The invention claimed is:

1. A solenoid valve, in which a rod is moved by a plunger that approaches and recedes from a stator by electromagnetic force, causing a valve body that opens and closes a valve to move reciprocally, wherein
   a first space and a second space are formed at respective sides of the plunger in a movement direction of the plunger, the first space being positioned on a side of the valve body,
   a through-hole is formed in the plunger so as to be concentric with a center axis,
   the rod is arranged in the first space,
   a communication passage is formed between an inner surface of the plunger and an outer surface of the rod and communicates with the first space and the second space,
   the rod has a first part, a second part and a third part which are axially arranged from a side of the valve body toward a side of the plunger,
   an outer peripheral surface of the first part is a circular surface extending over the entire circumference thereof,
   an outer peripheral surface of the second part has at least an arc surface and a cutout surface,
   an outer peripheral surface of the third part has at least an arc surface and a cutout surface,
   the arc surface of the second part is flush with the circular surface of the first part,
   the arc surface of the third part is formed on an inner diameter side with respect to the arc surface of the second part, and
   the cutout surface of the second part and the cutout surface of the third part are flush with each other so as to collectively form one flat surface.

2. The solenoid valve according to claim 1, wherein the third part is fitted into and fixed to the through-hole.

3. The solenoid valve according to claim 2, wherein the cutout surfaces of the second and third parts is formed to extend from the plunger to the first space.

4. The solenoid valve according to claim 2, wherein a plurality of the cutout surfaces of the second part and a plurality of cutout surfaces of the third part are provided to be equiangularly arranged in a circumferential direction.

5. The solenoid valve according to claim 2, wherein a leading end portion of the third part forms a tapered shape.

6. The solenoid valve according to claim 2, wherein the rod has a fitting restricting portion that comes into contact with an end face of the plunger, and
   the fitting restricting portion is formed by an axial end face of the second part which continuously extends from the arc surface of the third part.

7. The solenoid valve according to claim 3, wherein a plurality of the cutout surfaces of the second part and a plurality of cutout surfaces of the third part are provided to be equiangularly arranged in a circumferential direction.

8. The solenoid valve according to claim 3, wherein a leading end portion of the third part forms a tapered shape.

9. The solenoid valve according to claim 3, wherein the rod has a fitting restricting portion that comes into contact with an end face of the plunger, and
   the fitting restricting portion is formed by an axial end face of the second part which continuously extends from the arc surface of the third part.

10. The solenoid valve according to claim 4, wherein a leading end portion of the third part forms a tapered shape.

11. The solenoid valve according to claim 4, wherein the rod has a fitting restricting portion that comes into contact with an end face of the plunger, and
    the fitting restricting portion is formed by an axial end face of the second part which continuously extends from the arc surface of the third part.

12. The solenoid valve according to claim 5, wherein the rod has a fitting restricting portion that comes into contact with an end face of the plunger, and
    the fitting restricting portion is formed by an axial end face of the second part which continuously extends from the arc surface of the third part.

* * * * *